W. A. PARENT.
ADJUSTABLE SUPPORT.
APPLICATION FILED OCT. 30, 1920.
1,396,777. Patented Nov. 15, 1921.
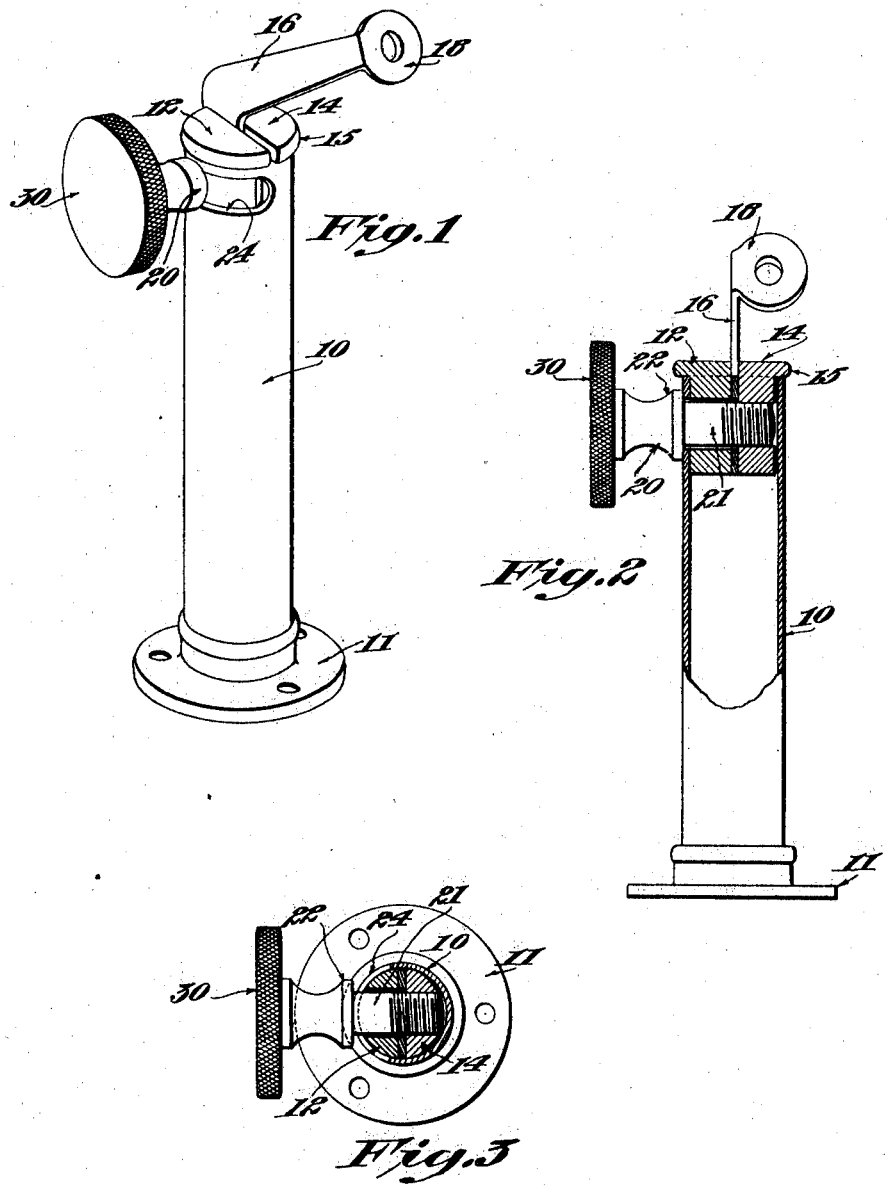

UNITED STATES PATENT OFFICE.

WILFRED A. PARENT, OF SALEM, MASSACHUSETTS.

ADJUSTABLE SUPPORT.

1,396,777.   Specification of Letters Patent.   Patented Nov. 15, 1921.

Application filed October 30, 1920. Serial No. 420,797.

*To all whom it may concern:*

Be it known that I, WILFRED A. PARENT, a citizen of the United States, residing at Salem, in the county of Essex and State of Massachusetts, have invented certain new and useful Improvements in Adjustable Supports; and I do hereby declare the following to be a full, clear, and exact description of the invention, such as will enable others skilled in the art to which it appertains to make and use the same.

The present invention relates to adjustable supports and more particularly to apparatus of this character employed for supporting mirrors, lights and possibly other appurtenances of a motor vehicle.

It is desirable to provide a simple, compact and relatively inexpensive support for a mirror or spot-light which will permit angular adjustment of the mirror or light and firmly retain these members in adjusted position.

It is accordingly one object of the present invention to provide a simple and compact support of the character described which permits the necessary adjustments to be made with facility. With this object in view, the several features of the invention consist in certain novel features of construction, combinations and arrangements of parts hereinafter described and claimed, the advantages of which will be obvious to those skilled in the art from the following description.

In the accompanying drawings illustrating the preferred form of the invention Figure 1 represents an elevation of the improved support embodying the features of the invention; Fig. 2 is a front elevation partly in section of the support shown in Fig. 1; and Fig. 3 is a top plan view partly in section of the support.

The support shown in the illustrated embodiment of the invention comprises essentially a base member, a supporting arm for a mirror or other device, and means for clamping and locking the supporting arm to the base member adapted to permit angular adjustment of the arm with respect to the base member. As shown in the drawings, the base member consists of a hollow standard 10 having a base 11 adapted for attachment to the motor vehicle. The opposite open end of the hollow standard receives two substantially semi-cylindrical blocks 12 and 14 fitting fairly closely within the standard and each having a projecting flange 15, which holds them in the proper relation thereto. The blocks 12 and 14 are so designed that when received within the standard a space is left between the opposite flat faces of sufficient width to receive one end of a sheet metal supporting arm 16. In the illustrated embodiment of the invention this supporting arm is bent as indicated in Fig. 1 and is provided with an offset attaching head 18 which may be secured to the back of a mirror or to a spot-light in any desired manner.

The spacer blocks 12 and 14, together with the supporting arm 16, are locked to one another and to the hollow standard 10 by a clamping member 20 having a threaded stem 21 which passes loosely through openings formed in the block 12 and the arm 16 and engages with corresponding threads formed in the block 14. The clamping member 20 is provided with a hub 22 which engages with the outer peripheral surface of the standard 10 when the several parts are clamped together. It will be observed that upon disengaging the clamping member 20 from the threaded openings in the block 14 and withdrawing the latter from the standard 10, the spacer blocks and the block 14 may be completely removed from the standard. In utilizing the member 20 to clamp the parts in adjusted position, the spacer block 14 acts as a nut to draw the supporting arm toward the block or abutment 12 and rigidly clamp the end of the arm between the parallel flat faces of the two blocks. In order to permit a swiveling movement of the arm 16 with respect to the standard an elongated opening 24 is formed in the standard through which the clamping member passes, this elongated opening permitting the spacer blocks and the supporting arm to be revolved through an angle of approximately 90°. With this construction it will be observed that any desired angular adjustment of the arm may be secured either by rotating the arm with respect to the spacer blocks or by revolving the blocks and arm bodily within the standard. After the desired adjustment has been obtained the arm may be rigidly clamped in adjusted position by manipulation of the knurled head 30 formed upon the clamping member.

This apparatus forms an exceedingly simple and efficient construction for supporting mirrors and similar appurtenances upon any desired part of the motor vehicle.

While it is preferred to employ the specific construction and arrangement of parts shown and described, it will be understood that this construction and arrangement is not essential except so far as specified in the claims, and may be changed or modified without departing from the broader features of the invention.

The invention having been described, what is claimed is:

1. An adjustable support comprising a tubular base member, two spacer blocks within the base member, a flat supporting arm received between the blocks, and a clamping member extending through the base member transversely of the blocks and arm to clamp the blocks and arm to one another and to the base member.

2. A tubular base member having a transverse opening, a connector stud extending through the opening transversely of the base member, substantially semi-cylindrical spacer blocks connected to the stud and adapted to swivel within the base member by movement of the stud lengthwise of the opening, and an arm pivoted upon the stud between the spacer blocks.

3. An adjustable support comprising a tubular base member having an elongated opening formed therein, a spacer block received within the base member, a flat supporting arm engaging with the spacer block, and a threaded clamping stud extending through the opening in the base member transversely of the supporting arm and adapted to clamp the arm to the base member.

4. An adjustable support comprising a tubular base member, a supporting arm, and adjustable clamping connections between the supporting arm and base member adapted to permit a pivoting movement of the arm and a bodily swiveling movement about the axis of the base member.

5. An adjustable support comprising a hollow standard, two semi-cylindrical blocks received within the standard having opposite flat faces, a flat supporting arm positioned between the blocks, and a clamping member extending transversely through the arm and blocks and threadedly engaging one of the blocks to draw the blocks together and clamp the flat supporting arm between them.

WILFRED A. PARENT.